United States Patent [19]

White et al.

[11] Patent Number: 5,962,093
[45] Date of Patent: Oct. 5, 1999

[54] THERMALLY STABLE POLYETHERAMINES

[75] Inventors: Jerry E. White; Joe T. Sanford, both of Lake Jackson; Terry W. Glass, Richwood, all of Tex.

[73] Assignee: The Dow Chemical Company, Midland, Mich.

[21] Appl. No.: 08/956,200

[22] Filed: Oct. 22, 1997

[51] Int. Cl.$^6$ .................................................. B29D 22/00
[52] U.S. Cl. .................. 428/35.2; 428/35.4; 428/36.6; 428/36.7; 428/412; 428/413; 428/480; 428/516; 428/523; 428/474.4; 528/97; 528/99; 528/102; 528/104; 528/111; 528/109; 528/118; 528/121; 528/124
[58] Field of Search .................... 428/36.6, 36.7, 428/35.4, 35.2, 412, 413, 480, 516, 523, 474.4; 528/97, 99, 102, 104, 111, 118, 109, 121, 124

[56] References Cited

U.S. PATENT DOCUMENTS

| | | | |
|---|---|---|---|
| 5,275,853 | 1/1994 | Silvis | 428/35.4 |
| 5,360,831 | 11/1994 | Lidy | 521/99 |
| 5,445,669 | 8/1995 | Nakabayashi | 96/5 |
| 5,773,139 | 6/1998 | Ogura | 428/332 |

*Primary Examiner*—Leszek Kiliman
*Attorney, Agent, or Firm*—Nemia C. Damocles

[57] ABSTRACT

A laminate structure comprises one or more layers of an organic polymer and one or more layers of a hydroxy-functionalized polyetheramine, wherein the hydroxy-functionalized polyetheramine layer is adhered directly to a contiguous organic polymer layer without an adhesive layer therebetween. The hydroxy-functionalized polyetheramine is prepared by reacting (1) a difunctional amine with (2) a diglycidyl ether or a diepoxy-functionalized poly(alkylene oxide) under conditions sufficient to cause the amine moieties to react with the epoxy moieties to form a polymer backbone having amine linkages, ether linkages and pendant hydroxyl moieties and then treating the reaction product with a monofunctional nucleophile which is not a primary or secondary amine.

26 Claims, No Drawings

THERMALLY STABLE POLYETHERAMINES

BACKGROUND OF THE INVENTION

This invention relates to polyethers having pendant hydroxyl moieties and to methods of using them as barrier articles to protect oxygen-sensitive materials. More particularly, this invention relates to hydroxy-functionalized polyetheramines.

Hydroxy-functionalized polyetheramines are known and are described, for example, in U.S. Pat. Nos. 5,275,853 and 5,464,924. These polyetheramines exhibit oxygen transmission rates of from 0.57 to 19 $cm^3$-mil/100 $in^2$-atm ($O_2$)-day, and are useful in the fabrication of barrier containers and films and as molding, extrusion and casting resins. Residual epoxy end groups in hydroxy-functionalized polyetheramines can sometimes limit their utility by promoting cross-linking and gelation during melt fabrication. Melt-stable hydroxy-functionalized polyetheramines, along with a process for their preparation, would clearly be desirable.

SUMMARY OF THE INVENTION

The present invention is, in a first aspect, a hydroxy-functionalized polyetheramine represented by the formula:

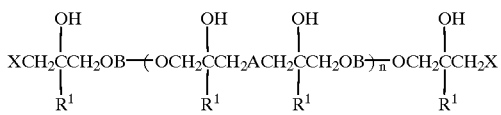

wherein each A is independently an amine moiety and each B is independently a divalent aromatic moiety; $R^1$ is hydrogen or a hydrocarbyl moiety; X is (a) a monovalent moiety, which is not a secondary or tertiary amine and which does not contain a substituent capable of cross-linking the polyetheramine at normal processing temperature, or (b) a combination of (i) a monovalent moiety which is not a secondary or tertiary amine and which does not contain a substituent capable of cross-linking the polyetheramine at normal processing temperature and (ii) a monovalent moiety which is a secondary or tertiary amine; and n is a whole number from about 5 to about 1000.

In a second aspect, the present invention is a process for preparing a hydroxy-functionalized polyetheramine which comprises reacting (1) a difunctional amine with (2) a diglycidyl ether or a diepoxy-functionalized poly(alkylene oxide) under conditions sufficient to cause the amine moieties to react with the epoxy moieties to form a polymer backbone having amine linkages, ether linkages and pendant hydroxyl moieties and then treating the reaction product with a monofunctional nucleophile which is not a primary or secondary amine, optionally in the presence of a catalyst.

In a third aspect, the present invention is a laminate structure comprising one or more layers of an organic polymer and one or more layers of the hydroxy-functionalized polyetheramine of the first aspect, wherein the hydroxy-functionalized polyetheramine layer is adhered directly to a contiguous organic polymer layer without an adhesive layer therebetween.

In a fourth aspect, the present invention is an article fabricated from the hydroxy-functionalized polyetheramine or laminate structure thereof, and can be in the form of a molded or coextruded container, or an impermeable monolayer or multilayer film. The article is suitable for packaging oxygen-sensitive materials such as foodstuffs and medicines.

In a fifth aspect, the present invention is a solvent or waterborne coating prepared from the hydroxy-functionalized polyetheramine.

These hydroxy-functionalized polyetheramines are melt stable thermoplastics and exhibit oxygen transmission rates below 20 cc-mil/100 $in^2$-atm-day.

In addition to their use as barrier containers, films, laminate structures and coatings, the polymers of this invention are also useful as molding, extrusion and casting resins.

DETAILED DESCRIPTION OF THE INVENTION

In preferred embodiments of the present invention, each A in the above formula is independently an amine moiety represented by any one of the formulas:

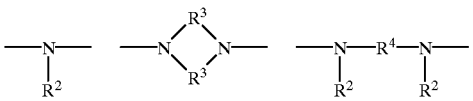

wherein $R^2$ is a hydrocarbyl, heterohydrocarbyl, inertly substituted hydrocarbyl or inertly substituted heterohydrocarbyl moiety, wherein the substituent(s) is hydroxyl, cyano, halo, arlyloxy, alkylamido, arylamido, alkylcarbonyl, or arylcarbonyl; $R^3$ and $R^4$ are independently a hydrocarbylene, heterohydrocarbylene, inertly substituted hydrocarbylene or inertly substituted heterohydrocarbylene moiety, wherein the substituent(s) is hydroxyl, cyano, halo, arlyloxy, alkylamido, arylamido, alkylcarbonyl, or arylcarbonyl with ethylene and p-xylylene being most preferred; each X is independently hydrogen, a primary amino moiety, a hydroxyl moiety, an alkyl, heteroalkyl, inertly substituted alkyl or inertly substituted heteroalkyl group, an aryl or inertly substituted aryl group, an alkoxy or inertly substituted alkoxy group; an aryloxy or inertly substituted aryloxy group, an alkanethio or inertly substituted alkanethio group; an arenethio or inertly substituted arenethio group, wherein the substituent(s) is hydroxyl, cyano, halo, arlyloxy, alkylamido, arylamido, alkylcarbonyl, or arylcarbonyl; or is represented by any one of the formulas:

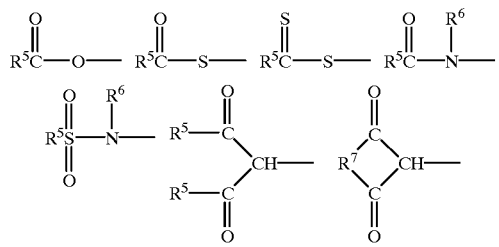

wherein $R^5$ is independently an alkyl or heteroalkyl, inertly substituted alkyl or heteroalkyl, aryl or inertly substituted aryl group, wherein the substituent(s) is cyano, halo, arlyloxy, alkylamido, arylamido, alkylcarbonyl, or arylcarbonyl; $R^6$ is independently hydrogen, an alkyl or heteroalkyl, inertly substituted alkyl or heteroalkyl, aryl or inertly substituted aryl group, wherein the substituent(s) is the same as that for $R^5$; and $R^7$ is an alkylene or heteroalkylene, inertly substituted alkylene or heteroalkylene, arylene or inertly substituted arylene moiety, wherein the substituent(s) is the same as that for $R^3$ and $R^4$.

In the more preferred embodiments of the present invention, X is methoxy, ethoxy, propoxy, 2-(methoxy)

ethoxy, 2-(ethoxy)ethoxy, benzyloxy, phenyloxy, p-methylphenyloxy, p-methoxyphenoxy, 4-tert-butylphenyloxy, methylmercapto, ethylmercapto, propylmercapto, 2-(methoxy)ethylmercapto, 2-(ethoxy) ethylmercapto, benzylmercapto, 2,3-dihydroxypropylmercapto, phenylmercapto, p-methylphenylmercapto, acetate, benzoate, acetamido or benzenesulfonamido; $R^1$ is hydrogen or methyl; $R^2$ is methyl, ethyl, propyl, isopropyl, 2-hydroxyethyl, 3-hydroxypropyl, 2-hydroxypropyl, 2,3-dihydroxypropyl, 2-(acetamido)ethyl, benzyl, phenyl, p-methoxyphenyl, p-methylphenyl; $R^3$ is ethylene, 1,2-propylene or 1,2-butylene and $R^4$ is ethylene, 1,2-propylene or 1,2-butylene, propylene, butylene, hexamethylene, 1,4-xylylene, 1,3-xylylene, 1,4-phenylene, 1,3-phenylene or 1,2-phenylene; and B is 1,4-phenylene, 1,3-phenylene, 1,2-phenylene, methylenediphenylene, isopropylidenediphenylene, oxydiphenylene, thiodiphenylene, carbonyldiphenylene, diphenylflourene or a-methylstilbene or a combination thereof.

The hydroxy-functionalized polyetheramines of the present invention can be prepared by reacting a difunctional amine with an excess of a diglycidyl ether under conditions sufficient to cause the amine moieties to form a polymer backbone having amine linkages, ether linkages and pendant hydroxyl moieties and then treating the reaction product with a monofunctional nucleophile which is not a primary or secondary amine, optionally in the presence of a catalyst. Alternatively, the hydroxy-functionalized polyetheramines can be prepared by reacting a difunctional amine with an equimolar amount of a diglycidyl ether and then treating the reaction product with a monofunctional nucleophile which is not a primary or secondary amine, optionally in the presence of a catalyst.

As used herein, the term "diglycidyl ether" means the reaction product of an aromatic, aliphatic or poly(alkylene oxide) diol with epichlorohydrin.

The difunctional amines which can be employed in the practice of the present invention include the bis-secondary amines and primary amines. Suitable bis-secondary amines include piperazine and substituted piperazines, e.g. dimethylpiperazine and 2-methylamidopiperazine; bis(N-methylamino)benzene, 1,2-bis(N-methylamino)ethane, and N,N'-bis(2-hydroxyethyl)ethylenediamine. Preferred bis-secondary amines are piperazine, dimethylpiperazine, and 1,2-bis(N-methylamino)ethane. The most preferred bis-secondary amine is piperazine. Suitable primary amines include aniline and substituted anilines, e.g. 4-(methylamido)aniline, 4-methylaniline, 4-methoxyaniline, 4-tert-butylaniline, 3,4-dimethoxyaniline, 3,4-dimethyaniline; alkylamines, and substituted alkyl amines, e.g. butylamine and benzylamine; and alkanol amines; e.g. 2-aminoethanol and 1-aminopropan-2-ol. Preferred primary amines are aniline, 4-methoxyaniline, 4-tert-butylaniline, butylamine, and 2-aminoethanol. Most preferred primary amines are 4-methoxyaniline and 2-aminoethanol.

The diglycidyl ethers which can be employed in the practice of the present invention for preparing the polyetheramines include the diglycidyl ethers of the amide-containing bisphenols such as N,N'-bis(hydroxyphenyl)-alkylenedicarboxamides, N,N'-bis(hydroxyphenyl)arylenedicarboxamides, bis(hydroxybenzamido)alkanes or bis(hydroxybenzamido)arenes, N-(hydroxyphenyl)hydroxybenzamides, 2,2-bis(hydroxyphenyl)acetamides, N,N'-bis(3-hydroxyphenyl)glutaramide, N,N'-bis(3-hydroxyphenyl)adipamide, 1,2-bis(4-hydroxybenzamido)-ethane, 1,3-bis(4-hydroxybenzamide)benzene, N-(4-hydroxyphenyl)-4-hydroxybenzamide, and 2,2-bis(4-hydroxyphenyl)acetamide, 9,9-bis(4-hydroxyphenyl)-fluorene, hydroquinone, resorcinol, 4,4'-sulfonyl-diphenol, 4,4'-thiodiphenol, 4,4'-oxydiphenol, 4,4'-dihydroxybenzophenone, tetrabromoisopropylidene-bisphenol, dihydroxy dinitrofluorenylidenediphenylene, 4,4-bis(4-hydroxyphenyl)methane, α,α-bis(4-hydroxyphenyl)-ethylbenzene, 2,6-dihydroxynaphthalene and 4,4'-isopropylidene bisphenol (bisphenol A). More preferred diglycidyl ethers are the diglycidyl ethers of 9,9-bis (4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenol, 4,4'-dihydroxybiphenylene oxide, bis(4-hydroxyphenyl)-methane, α,α-bis(4-hydroxyphenyl)ethylbenzene, 2,6-dihydroxynaphthalene and 4,4'-isopropylidene bisphenol (bisphenol A). Most preferred diglycidyl ethers are the diglycidyl ethers of 4,4'-isopropylidene bisphenol (bisphenol A), 4,4'-sulfonyldiphenol, 4,4'-oxydiphenol, 4,4'-dihydroxybenzophenone, and 9,9-bis(4-hydroxy-phenyl) fluorene.

The monofunctional nucleophiles which can be employed in the practice of the present invention include water, hydrogen sulfide, ammonia, ammonium hydroxide, a hydroxyarene, an aryloxide salt, a carboxylic acid, a carboxylic acid salt, a mercaptan or a thiolate salt. Preferably, the hydroxyarene is phenol, cresol, methoxyphenol, or 4-tert-butylphenol; the aryloxide salt is sodium or potassium phenate; the carboxylic acid is acetic acid or benzoic acid; the carboxylic acid salt is sodium acetate, sodium benzoate, sodium ethylhexanoate, potassium acetate, potassium benzoate, potassium ethylhexanoate, or calcium ethylhexanoate; the mercaptan is 3-mercapto-1,2-propanediol or benzenethiol; and the thiolate salt is sodium or potassium benzenethiolate.

Preferred catalysts include metal hydroxides, quaternary ammonium salts or quaternary phosphonium salts. Especially preferred catalysts include sodium hydroxide, potassium hydroxide, ammonium hydroxide, ethyltriphenylphosphonium acetate, tetrabutylammonium bromide and bis (triphenylphosphoranylidene)ammonium chloride.

The conditions at which the reaction is most advantageously conducted are dependent on a variety of factors, including the specific reactants, solvent, and catalyst employed but, in general, the reaction is conducted under a non-oxidizing atmosphere such as a blanket of nitrogen, preferably at a temperature from about 100° C. to about 190° C. The reaction can be conducted neat (without solvent or other diluents). However, in order to ensure homogeneous reaction mixtures at such temperatures, it is often desirable to use inert organic solvents for the reactants. Examples of suitable solvents include 1-methyl-2-pyrrolidinone (NMP), and ethers or hydroxy ethers such as diglyme, triglyme, diethylene glycol ethyl ether, diethylene glycol methyl ether, dipropylene glycol methyl ether, propylene glycol phenyl ether, propylene glycol methyl ether and tripropylene glycol methyl ether.

After treating the reaction product with a monofunctional nucleophile which is not a primary or secondary amine, the polyetheramine can be recovered from the reaction mixture by conventional methods. For example, the reaction mixture containing the polymer can be diluted with a suitable solvent such as dimethylformamide, cooled to room temperature, and the polymer isolated by precipitation from a non-solvent such as a 50/50 mixture of methanol and water. The precipitated polymer can then be purified by washing such as by a first wash with fresh 50/50 mixture of methanol and water and then fresh water. The polymer is collected by filtration, washed with a suitable solvent, such as water and then dried.

Films prepared from the hydroxy-functionalized polyetheramine of the present invention generally have oxygen transmission rates (OTR) from about 0.1 to about 4 cc/mil/100 in$^2$/atm/day, at 25° C. and 60 percent relative humidity (ASTM D-3985); carbon dioxide transmission rates (CO$_2$TR) from about 1.5 to about 35 cc-mil/100 in$^2$-atm-day, at 23° C. and 0 percent relative humidity and water vapor transmission rates (WVTR) from about 0.7 to about 3.5 cc-mil/100 in$^2$-atm-day, at 38° C. and 90 percent relative humidity (ASTM F-372).

Films and laminate structures can be formed from the hydroxy-functionalized polyetheramine of the present invention by using conventional extrusion techniques such as feedblock extrusion, multimanifold die coextrusion or combinations of the two, or by solvent spraying or solution casting. Solution casting is a well known process and is described, for example, in the *Plastics Engineering Handbook* of the Society of the Plastics Industry, Inc, 4th Edition, page 448.

Containers and other molded parts can be fabricated from the films or laminate structures comprising the hydroxy-functionalized polyetheramine of the present invention by using conventional fabricating techniques for thermoplastic polymers such as compression molding, injection molding, extrusion, thermoforming, blow molding and solvent casting.

In general, laminate structures can be formed from the hydroxy-functionalized polyetheramine of the present invention by coextruding one or more layers of an organic polymer and one or more layers of the hydroxy-functionalized polyetheramine, wherein the hydroxy-functionalized polyetheramine layer is adhered directly to a contiguous organic polymer layer without an adhesive layer therebetween.

The laminate structure can be a three-layer laminate comprising a first outer layer of an organic polymer, a core layer of the hydroxy-functionalized polyetheramine and a second outer layer of an organic polymer which is the same as or different from the organic polymer of the first outer layer.

The laminate structure can also be a three-layer laminate comprising a first outer layer of the hydroxy-functionalized polyetheramine, a core layer of an organic polymer and a second outer layer of an organic polymer which is the same as or different from the organic polymer of the core layer.

The laminate structure can also be a three-layer laminate comprising a first outer layer of the hydroxy-functionalized polyetheramine, a core layer of an organic polymer and a second outer layer of the hydroxy-functionalized polyetheramine which is the same as or different from the hydroxy-functionalized polyetheramine of the first outer layer.

Organic polymers which can be employed in the practice of the present invention for preparing the laminate structure include crystalline thermoplastic polyesters, such as polyethylene terephthalate (PET); polyamides, polyolefins, and polyolefins based on monovinyl aromatic monomers.

Polyesters and methods for their preparation are well known in the art and reference is made thereto for the purposes of this invention. For purposes of illustration and not limitation, reference is particularly made to pages 1–62 of Volume 12 of the *Encyclopedia of Polymer Science and Engineering,* 1988 revision, John Wiley & Sons.

Polyamides which can be employed in the practice of the present invention include the various grades of nylon, such as nylon-6, nylon-6,6 and nylon-12.

Polyolefins which can be employed in the practice of the present invention include, for example, low density polyethylene, linear low density polyethylene, very low density polyethylene, polypropylene, polybutene, ethylene/vinyl acetate copolymers, ethylene/propylene copolymers and ethylene/butene-1 copolymers.

Polyolefins based on monovinyl aromatic monomers which can be employed in the practice of the present invention include polystyrene, polymethylstyrene, styrene/methylstyrene or styrene/chlorostyrene copolymers.

Other organic polymers of the polyester or polyamide type can also be employed in the practice of the present invention for preparing the laminate structure. Such polymers include polyhexamethylene adipamide, polycaprolactone, polyhexamethylene sebacamide, polyethylene 2,6-naphthalate and polyethylene 1,5-naphthalate, polytetramethylene 1,2-dioxybenzoate and copolymers of ethylene terephthalate and ethylene isophthalate.

The thickness of each layer in the laminate structure is dependent on a number of factors, including the intended use, materials stored in the container, the length of storage prior to use and the specific composition employed in each layer of the laminate.

In general, the laminate structure will have a total thickness of from about 0.5 to about 500 mils, preferably from about 1.0 to about 250 mils; with the thickness of the hydroxy-functionalized polyetheramine layer(s) being from about 0.05 to about 100 mils, preferably from about 0.1 to about 50 mils; and the thickness of the polyester layer(s) being from about 0.45 to about 400 mils, preferably from about 0.9 to about 200 mils.

The hydroxy-functionalized polyetheramine can also be prepared and fabricated into a shaped article by a reactive extrusion process wherein the reactants are fed into and reacted in an extruder using the conditions described in U.S. Pat. No. 4,612,156, which is incorporated herein by reference.

The following working examples are given to illustrate the invention and should not be construed as limiting its scope. Unless otherwise indicated, all parts and percentages are by weight.

EXAMPLES

Comparative Example A

A stirred solution of the diglycidyl ether of bisphenol A (epoxy equivalent weight=172.3; 212.56 g, 0.617 mol), ethanolamine (37.44 g, 0.614 mol) and dipropylene glycol methyl ether (170 mL) is heated slowly to 152° C. and then maintained at 140° C. to 143° C. for 1.5 hours, during which 20 to 50 mL aliquots of additional solvent (330 mL) are added to ensure adequate stirring as the solution viscosity increases. The solution is allowed to cool to room temperature and then poured into a vigorously stirred solution of methanol (300 mL) and ice water (2.2 L) to precipitate a polyetheramine as fibrous powder, which is collected by decantation, stirred with methanol/water and collected by filtration. The product then is mechanically agitated with 4:1 water/methanol for 24 hours, collected by filtration, dried in vacuo at 35° C. for 4 hours, redissolved in tetrahydrofuran (2 mL/gram of product), again precipitated from methanol/water and dried in vacuo at 82° C. for 16 hours, after which the polymer is no longer soluble in tetrahydrofuran or dimethylformamide (DMF). These results indicate that the polymer cross-links at elevated temperature and is not thermoplastic.

Example 1

A stirred 85.7 g solution of polyetheramine (29.5 g) in dipropylene glycol methyl ether, prepared as described in Comparative Example A prior to product precipitation and isolation, is heated to 52° C., charged with 0.91 g of ammonium hydroxide solution (28–30 percent aqueous ammonia), and then maintained at 71° C. for 18 hours. Additional aqueous ammonia (0.65 g) then is added and stirring at 143° C. is continued for 1.5 hours. The product then is isolated as described in Comparative Example A. After drying in vacuo at 76° C. for 16 hours, the product remains soluble in DMF, has an inherent viscosity of 0.64 dL/g (0.5 g/dL; DMF; 25° C.), and shows essentially no change in an initial melt viscosity of about 1000 Pa-s after 30 minutes at 200° C. as measured with a rheometer in oscillatory mode at 5 percent strain and 10 rad/s at a gap distance of 0.5 mm. These results show that ammonia consumes any residual epoxy groups in the product and yields a thermally processable thermoplastic.

Example 2

A stirred 98.7 g solution of polyetheramine (34.0 g) in dipropylene glycol methyl ether, prepared as described in Comparative Example A prior to product precipitation and isolation, is charged with benzoic acid (2.0 g), and then maintained at 134° C. to 143° C. for 2 hours. The product then is isolated as described in Comparative Example A. After drying in vacuo at 82° C. for 16 hours, the product remains soluble in DMF, has an inherent viscosity of 0.68 dL/g (0.5 g/dL; DMF; 25° C.), and shows essentially no change in an initial melt viscosity of about 1000 Pa-s after 30 minutes at 200° C. as measured with a rheometer in oscillatory mode at 5 percent strain and 10 rad/s at a gap distance of 0.5 mm. These results show that benzoic acid consumes any residual epoxy groups in the product and yields a thermally processable thermoplastic.

Example 3

A stirred 98.1 g solution of polyetheramine (33.8 g) in dipropylene glycol methyl ether, prepared as described in Comparative Example A prior to product precipitation and isolation, is charged with phenol (1.52 g), and heated to 80° C., after which 0.11 g of tetrabutylphosphonium acetate (50 percent in methanol) is added, and the resulting solution is maintained at 150° C. for 2.5 hours. The product then is isolated as described in Comparative Example A. After drying in vacuo at 82° C. for 16 hours, the product remains soluble in DMF, has an inherent viscosity of 0.55 dL/g (0.5 g/dL; DMF; 25° C.), and shows essentially no change in an initial melt viscosity of about 1000 Pa-s after 30 minutes at 200° C. as measured with a rheometer in oscillatory mode at 5 percent strain and 10 rad/s at a gap distance of 0.5 mm. These results show that phenol consumes any residual epoxy groups in the product and yields a thermally processable thermoplastic.

Example 4

A stirred 98.8 g solution of polyetheramine (34.0 g) in dipropylene glycol methyl ether, prepared as described in Comparative Example A prior to product precipitation and isolation, is charged with 3-mercapto-1,2-propanediol (2.0 g), and then maintained at 81° C. for 12 hours and then at 149° C. for 3 hours. The product then is isolated as described in Comparative Example A. After drying in vacuo at 82° C. for 16 hours, the product remains soluble in DMF, has an inherent viscosity of 0.46 dL/g (0.5 g/dL; DMF; 25° C.), and shows essentially no change in an initial melt viscosity of about 1000 Pa-s after 30 minutes at 200° C. as measured with a rheometer in oscillatory mode at 5 percent strain and 10 rad/s at a gap distance of 0.5 mm. These results show that 3-mercapto-1,2-propanediol consumes any residual epoxy groups in the product and yields a thermally processable thermoplastic.

Example 5

A stirred 111.5 g solution of polyetheramine (38.4 g) in dipropylene glycol methyl ether, prepared as described in Comparative Example A prior to product precipitation and isolation, is charged with 4-tert-butylphenol (2.76 g) and heated to 80° C. Tetrabutylphosphonium acetate (50 percent in methanol, 0.086 g) is added and the solution is stirred at 149° C. for 3 hours. The product then is isolated as described in Comparative Example A. After drying in vacuo at 82° C. for 16 hours, the product remains soluble in DMF, has an inherent viscosity of 0.62 dL/g (0.5 g/dL; DMF; 25° C.), and shows essentially no change in an initial melt viscosity of about 1000 Pa-s after 30 minutes at 200° C. as measured with a rheometer in oscillatory mode at 5 percent strain and 10 rad/s at a gap distance of 0.5 mm. These results show that 4-tert-butylphenol consumes any residual epoxy groups in the product and yields a thermally processable thermoplastic.

What is claimed is:

1. A thermoplastic hydroxy-functionalized polyetheramine having the formula:

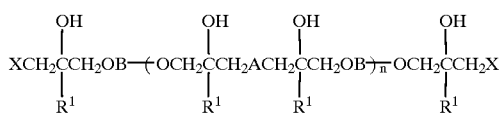

wherein each A is independently an amine moiety and each B is independently a divalent aromatic moiety; $R^1$ is hydrogen or a hydrocarbyl moiety; each X is independently hydrogen, a primary amino moiety, a hydroxyl moiety, an alkyl, heteroalkyl, inertly substituted alkyl or inertly substituted heteroalkyl group, an aryl or inertly substituted aryl group; an alkoxy or inertly substituted alkoxy group; an aryloxy or inertly substituted aryloxy group; an alkanethio or inertly substituted alkanethio group; an arenethio or inertly substituted arenethio group; wherein the substituent(s) is hydroxyl, cyano, halo, arlyloxy, alkylamido, arylamido, alkylcarbonyl, or arylcarbonyl; or independently represented by any one of the formulas:

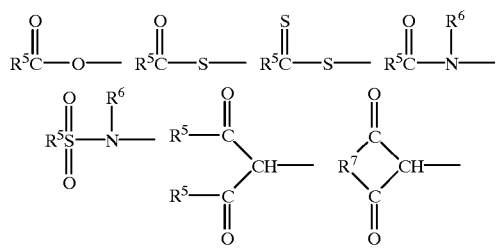

wherein $R^5$ is independently an alkyl or heteroalkyl, inertly substituted alkyl or heteroalkyl, aryl or inertly substituted aryl group, wherein the substituent(s) is cyano, halo, arlyloxy, alkylamido, arylamido, alkylcarbonyl, or arylcarbonyl; $R^6$ is independently hydrogen, an alkyl or heteroalkyl, inertly substituted alkyl or heteroalkyl, aryl or inertly substituted aryl group, wherein the substituent(s) is the same as that for $R^5$; and $R^7$ is an alkylene or heteroalkylene, inertly substituted alkylene or heteroalkylene, arylene or inertly substituted arylene moiety, wherein the substituent(s) is alkylamido, hydroxy, alkoxy, halo, cyano, aryloxy, alkylcarbonyl or arylcarbonyl; or a combination thereof with a monovalent moiety which is a secondary or tertiary amine; and n is a whole number from about 5 to about 1000.

2. The polyetheramine of claim 1 wherein A in the formula is represented by any one of the formulas:

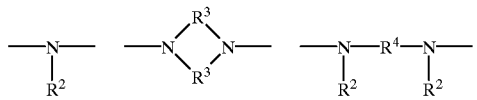

wherein each $R^2$ is independently a hydrocarbyl, heterohydrocarbyl, inertly substituted hydrocarbyl or inertly substituted heterohydrocarbyl moiety, wherein the substituent(s) is hydroxyl, cyano, halo, arlyloxy, alkylamido, arylamido, alkylcarbonyl, or arylcarbonyl; $R^3$ and $R^4$ are independently a hydrocarbylene, heterohydrocarbylene, inertly substituted hydrocarbylene or inertly substituted heterohydrocarbylene moiety, wherein the substituent(s) is alkylamido, hydroxy, alkoxy, halo, cyano, aryloxy, alkylcarbonyl or arylcarbonyl.

3. The polyetheramine of claim 2 wherein X is methoxy, ethoxy, propoxy, 2-(methoxy)ethoxy, 2-(ethoxy)ethoxy, benzyloxy, phenyloxy, p-methylphenyloxy, p-methoxyphenoxy, 4-tert-butylphenyloxy, methylmercapto, ethylmercapto, propylmercapto, 2-(methoxy)ethylmercapto, 2-(ethoxy)ethylmercapto, benzylmercapto, 2,3-dihydroxypropylmercapto, phenylmercapto, p-methylphenylmercapto, acetate, benzoate, acetamido or benzenesulfonamido.

4. The polyetheramine of claim 2 wherein $R^1$ is hydrogen or methyl; $R^2$ is methyl, ethyl, propyl, isopropyl, 2-hydroxyethyl, 3-hydroxypropyl, 2-hydroxypropyl, 2,3-dihydroxypropyl, 2-(acetamido)ethyl, benzyl, phenyl, p-methoxyphenyl, p-methylphenyl; $R^3$ is ethylene, 1,2-propylene or 1,2-butylene; and $R^4$ is ethylene, 1,2-propylene or 1,2-butylene, propylene, butylene, hexamethylene, 1,4-xylylene, 1,3-xylylene, 1,4-phenylene, 1,3-phenylene or 1,2-phenylene.

5. The polyetheramine of claim 4 wherein B is 1,4-phenylene, 1,3-phenylene, 1,2-phenylene, methylenediphenylene, isopropylidenediphenylene, oxydiphenylene, thiodiphenylene, carbonyldiphenylene, diphenylflourene or α-methylstilbene or a combination thereof.

6. The polyetheramine of claim 1 which is the reaction product of a diglycidyl ether, a difunctional amine and a monofunctional nucleophile which is water, hydrogen sulfide, ammonia, ammonium hydroxide, a hydroxyarene, an aryloxide salt, a carboxylic acid, a carboxylic acid salt, a mercaptan, or thiolate salt.

7. A process for preparing a thermoplastic hydroxy-functionalized polyetheramine which comprises reacting a difunctional amine with an excess or an equimolar amount of a diglycidyl ether, and treating the reaction product with a monofunctional nucleophile which is water, hydrogen sulfide, ammonia, ammonium hydroxide, a hydroxyarene, an aryloxide salt, a carboxylic acid, a carboxylic acid salt, a mercaptan, or thiolate salt, optionally in the presence of a catalyst.

8. The process of claim 7 wherein the hydroxyarene is phenol, cresol, methoxyphenol, or 4-tert-butylphenol.

9. The process of claim 7 wherein the aryloxide salt is sodium or potassium phenate.

10. The process of claim 7 wherein the carboxylic acid is acetic acid or benzoic acid.

11. The process of claim 7 wherein the carboxylic acid salt is sodium acetate, sodium benzoate, sodium ethylhexanoate, potassium acetate, potassium benzoate, potassium ethylhexanoate, or calcium ethylhexanoate.

12. The process of claim 7 wherein the mercaptan is 3-mercapto-1,2-propanediol or benzethiol.

13. The process of claim 7 wherein the thiolate salt is sodium or potassium benzenethiolate.

14. The process of claim 7 wherein the catalyst is a quaternary ammonium salt, a quaternary phosphonium salt or a metal hydroxide.

15. The process of claim 7 wherein the catalyst is ammonium hydroxide, ethyltriphenylphosphonium acetate, tetrabutylammonium bromide, bis(triphenylphosphoranylidene)ammonium chloride, sodium hydroxide or potassium hydroxide.

16. A laminate structure comprising one or more layers of an organic polymer and one or more layers of a hydroxy-functionalized polyetheramine, wherein said hydroxy-functionalized polyetheramine layer is adhered directly to a contiguous organic polymer layer without an adhesive layer therebetween, the hydroxy-functionalized polyetheramine having the formula:

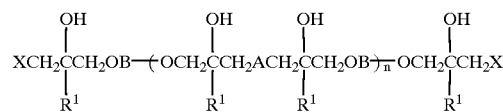

wherein each A is independently an amine moiety and each B is independently a divalent aromatic moiety; $R^1$ is hydrogen or a hydrocarbyl moiety; each X is independently hydrogen, a primary amino moiety, a hydroxyl moiety, an alkyl, heteroalkyl, inertly substituted alkyl or inertly substituted heteroalkyl group, an aryl or inertly substituted aryl group; an alkoxy or inertly substituted alkoxy group; an aryloxy or inertly substituted aryloxy group; an alkanethio or inertly substituted alkanethio group: an arenethio or inertly substituted arenethio group; wherein the substituent (s) is hydroxyl, cyano, halo, arlyloxy, alkylamido, arylamido, alkylcarbonyl, or arylcarbonyl; or independently represented by any one of the formulas:

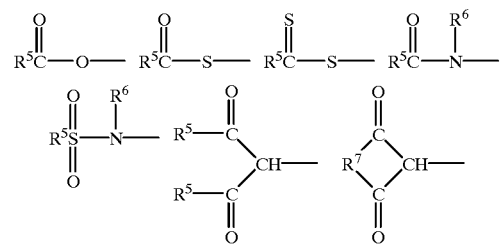

wherein $R^5$ is independently an alkyl or heteroalkyl, inertly substituted alkyl or heteroalkyl, aryl or inertly substituted aryl group, wherein the substituent(s) is cyano, halo, arlyloxy, alkylamido, arylamido, alkylcarbonyl, or arylcarbonyl: $R^6$ is independently hydrogen, an alkyl or heteroalkyl, inertly substituted alkyl or heteroalkyl, aryl or inertly substituted aryl group, wherein the substituent(s) is the same as that for $R^5$; and $R^7$ is an alkylene or heteroalkylene, inertly substituted alkylene or heteroalkylene, arylene or inertly substituted arylene moiety, wherein the substituent(s) is alkylamido, hydroxy, alkoxy, halo, cyano, aryloxy, alkylcarbonyl or arylcarbonyl; or a combination thereof with a monovalent moiety which is a secondary or tertiary amine, and n is a whole number from about 5 to about 1000.

17. The laminate structure of claim 16 comprising outer layers of an organic polymer and a core layer of the hydroxy-functionalized polyetheramine.

18. The laminate structure of claim 16 comprising a first outer layer of the hydroxy-functionalized polyetheramine, a core layer of an organic polymer and a second outer layer of an organic polymer which is the same as or different from the organic polymer of the core layer.

19. The laminate structure of claim 16 comprising a first outer layer of the hydroxy-functionalized polyetheramine, a core layer of an organic polymer and a second outer layer of the hydroxy-functionalized polyetheramine, which is the same as or different from the hydroxy-functionalized polyetheramine of the first outer layer.

20. The laminate structure of claim 16 wherein the organic polymer is a crystalline thermoplastic polyester, a polyamide, a polyolefin or a polyolefin based on monovinyl aromatic monomers.

21. The laminate structure of claim 20 wherein the crystalline polyester is polyethyleneterephthalate.

22. The laminate structure of claim 20 wherein the polyamide is nylon-6, nylon-6,6 or nylon-12.

23. The laminate structure of claim 20 wherein the polyolefin is polyethylene and the polyolefin based on monovinyl aromatic monomers is polystyrene, polymethylstyrene, styrene/methylstyrene copolymer or styrene/chlorostyrene copolymer.

24. The laminate structure of claim 16 wherein the organic polymer is polyhexamethylene adipamide, polycaprolactone, polyhexamethylene sebacamide, polyethylene 2,6-naphthalate, polyethylene 1,5-naphthalate, polytetramethylene 1,2-dioxybenzoate or ethylene terephthalate/ethylene isophthalate copolymer.

25. The polyetheramine of claim 1 in the form of a barrier film, a barrier container, a barrier coating, a foam or a molded article.

26. A solvent or waterborne coating composition prepared from the hydroxy-functionalized polyetheramine of claim 1.

* * * * *

UNITED STATES PATENT AND TRADEMARK OFFICE
CERTIFICATE OF CORRECTION

PATENT NO : 5,962,093

DATED : October 5, 1999

INVENTOR(S) : Jerry E. White; Joe F. Sanford; Terry W. Glass

It is certified that error appears in the above-identified patent and that said Letters Patent is hereby corrected as shown below:

Title Page [75] "Joe T. Sanford" should read - Joe. F. Sanford--.

Signed and Sealed this

Twenty-seventh Day of March, 2001

*Attest:*

NICHOLAS P. GODICI

*Attesting Officer*  *Acting Director of the United States Patent and Trademark Office*